United States Patent [19]
Dimitrov et al.

[11] 3,762,568
[45] Oct. 2, 1973

[54] TOOL MAGAZINE

[75] Inventors: Atanas Vasilev Dimitrov; Nicola Dimov Stoilov, both of Sofia, Bulgaria

[73] Assignee: DSO "Z M M", Sofia, Bulgaria

[22] Filed: Aug. 9, 1971

[21] Appl. No.: 170,261

[30] Foreign Application Priority Data
Aug. 7, 1970 Bulgaria .............................. 15424

[52] U.S. Cl. ................ 211/1.5, 29/211, 29/568, 211/60 T, 211/69, 211/70
[51] Int. Cl. ................ A47b 49/00, B25h 3/04
[58] Field of Search ............... 74/826; 29/568; 211/1.5, 69, 70, 60 T; 299/87

[56] References Cited
UNITED STATES PATENTS

| | | | |
|---|---|---|---|
| 3,621,736 | 11/1971 | Stanley | 74/826 X |
| 3,628,409 | 12/1971 | Chope | 74/826 |
| 3,650,018 | 3/1972 | Perry | 29/568 |
| 3,613,225 | 10/1971 | Sato | 29/568 |
| 3,540,332 | 11/1970 | Kvasnicka | 74/826 X |

*Primary Examiner*—Roy D. Frazier
*Assistant Examiner*—Abraham Frankel
*Attorney*—Arthur O. Klein

[57] ABSTRACT

A tool magazine for machine tools provided with program control and automatic tool changing. Tool-receiving seats are disposed in a helical line in equally angularly spaced axially extending rows along a cylinder which is simultaneously rotated and axially traversed so as sequentially to present desired tools at a fixed tool pick up point or station. The magazine has a motor which drives the cylinder, the motor being under the control of a pulse counter actuated by cams which are spaced at the same angle as the successive rows of seats in the cylinder.

8 Claims, 1 Drawing Figure

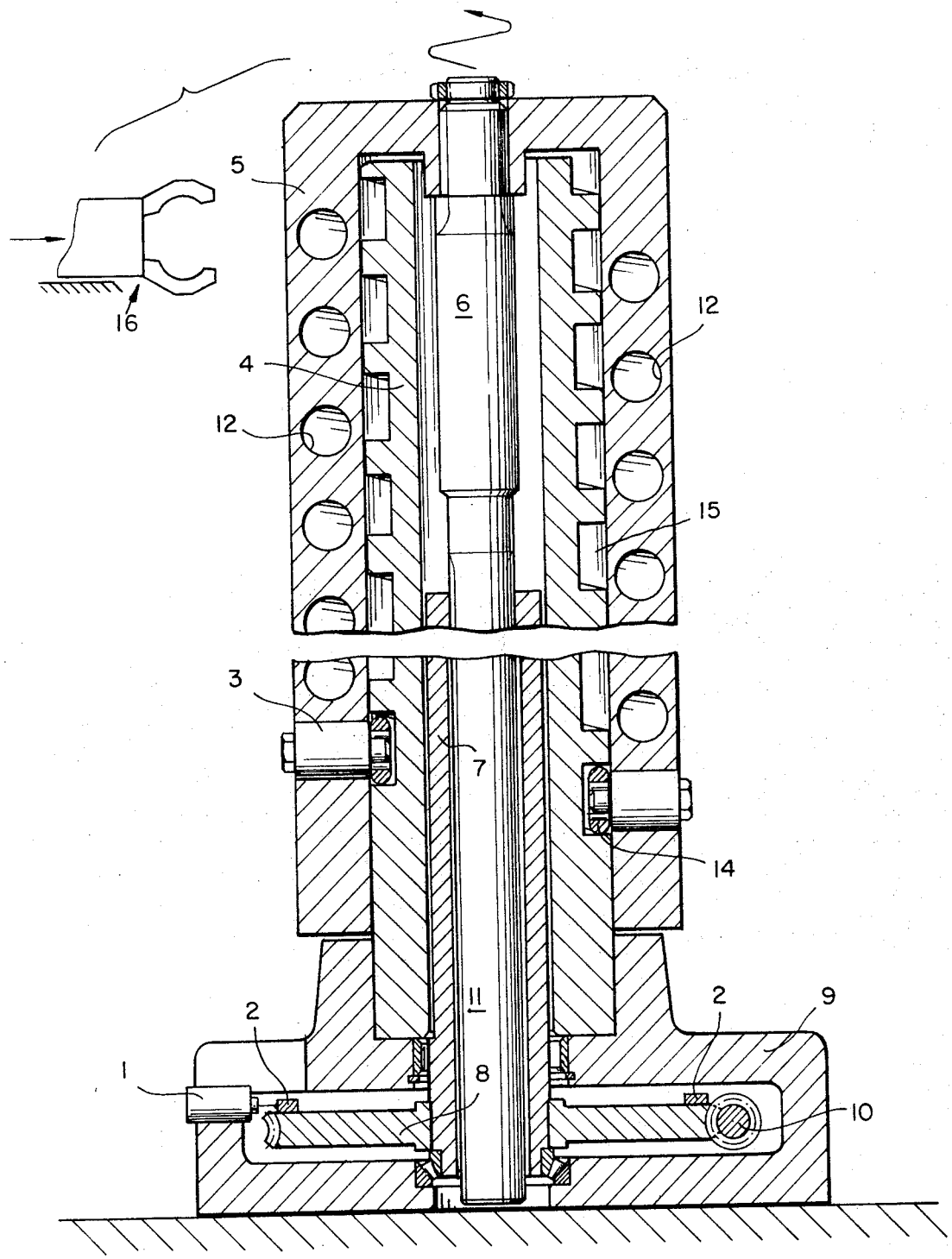

TOOL MAGAZINE

This invention relates to a tool magazine for machine tools provided with program control and automatic tool changing. It can also be used in machine tools in which the tool changing is carried out manually by the operator.

Machine tools are known, in which the tools are arranged around a circle. A feature of this type is the delivery of a new tool to a fixed pick up point. This leads to simplification of the auxiliary attachment or mechanical hand which picks up the tools and conveys it to the working spindle. A basic drawback of this type of magazines is the large area they occupy.

There are also known tool magazines in which the tools are arranged along an upright chain. Preserving the valuable feature of delivering the tools to a fixed or constant point, they permit an increase of the storage capacity at one and the same occupied area. Basic drawbacks of these magazines is the console-type arrangement of the tools with regard to the chain; this requires the installation of additional members for maintaining a constant direction of travel of the tools, as well as the console-type arrangement of the chain with respect to the stationary frame part of the magazine.

Also known is a design with a centered system of two vertical chains. This, however, is complicated by the installation of two mechanisms providing for the travel and rotation of the magazine, thus permitting the delivery of tools from the second chain after the tools of the first chain have all been used.

A design with a four-deck arrangement of the tools along a cycle is known. In such arrangement an increase of the storage capacity is achieved. A basic drawback of this design, apart from the large occupied area, is the poor manner of delivery of the tool. In this design, the auxiliary attachment which picks up the tools from the magazine, must be capable of traveling in the vertical plane, too, in order to be located in front of the next deck, after the tools of the previous deck have all been used.

It is therefore, a general object of the present invention to provide a design, which avoids the aforementioned drawbacks of the known tool magazines.

This object is attained by means of a device in which the seats for placing the tools are arranged along a helical line on a cylinder, in the bottom part of which there are stationary groove-following supports entering into a helical groove of a column which is fastened rigidly to a base. The cylinder is rigidly attached to serially connected elements including a first shaft, a second hollow shaft, and a worm wheel which is meshed with a worm driven by a motor. A splined connection between the first and second shafts permits the axial movement of the cylinder as it rotates.

For better understanding of the invention, reference should be had to the accompanying drawing in which there is illustrated a preferred embodiment of the invention. The sole FIGURE of the drawing shows a longitudinal cross-sectional view of the tool magazine.

An electric motor (not shown) provided with a built-in electromagnetic brake rotates a worm 10. The latter sets in motion a worm wheel 8 with which it meshes. Worm wheel 8 is rigidly attached to the hollow shaft 7. By means of a spline joint 11 the shaft 6 is rotated; shaft 6 is rigidly fastened to a tool-carrying cylinder 5. Arranged in cylinder 5 along a helical line are the seats 12 for the tools (not shown). The seats 12 are arranged in equally angularly spaced axially extending rows or columns. Located in the bottom part of the cylinder 5 are radially disposed groove-following supports 3 with needle bearing rollers 14 which, moving along the groove 15 of the helical line of column 4 which is fixedly secured to the frame or base 9, force the cylinder 5 to move vertically as it rotates. The helical groove 15 and groove-following rollers 14 constitute cooperating helical cam and cam follower means on the cylinder 5 and column 4. Fastened to the worm wheel 8 are cams 2, which are sequentially angularly spaced at the same central angle as that at which the vertical columns of the tool seats 12 are positioned. While rotating, the cams actuate a pulse counter 1. The tool pick up point or station is schematically shown in the drawing, wherein it is generally designated 16.

When the machine tool signals the need for picking up a new tool, the motor is energized to rotate the worm 10, the worm wheel 8, the hollow shaft 7, and the shaft 6 and the cylinder 5. At the same time the cylinder 5 is lifted along the helical groove of column 4 by means of the supports 3. The pulse counter 1 counts the pulses, and when the required number is attained, that is, the required number of seats 12 has passed the pick up point, the counter transmits a signal for switching off the motor and for actuating the brake, whereby the required tool is positioned in the pick up 16 at the pick up point.

Although the invention is illustrated and described with reference to one preferred embodiment thereof, it is to be expressly understood that it is in no way limited to the disclosure of such a preferred embodiment but is capable of numerous modifications within the scope of the appended claims.

What is claimed is:

1. A tool magazine comprising a frame, a cylinder having a plurality of tool-receiving seats arranged in a helical line on the cylinder and arranged in a plurality of equally angularly spaced axially extending rows, a fixed tool pickup station disposed to pick up a selected tool from its seat in the cylinder, and means to rotate the cylinder and to move it axially so as to move the tool seats so that each tool seat is sequentially positioned at the tool pickup station.

2. A tool magazine according to claim 1, comprizing a fixed column on which the cylinder is rotatably supported for movement axially thereof, and cooperating helical cam and cam follower means on the cylinder and column for causing the cylinder to travel axially as it rotates.

3. A tool magazine according to claim 2, wherein the cylinder is journalled on the column, the helical cam is a helical groove in the outer surface of the column, and the cam follower is composed of at least one radially inwardly directed member affixed to the cylinder and having its inner end received in the groove.

4. A tool magazine according to claim 3, wherein the means for rotating the cylinder comprises coaxial first and second shafts drivingly connected for axial travel relative to each other, a motor for rotating the first shaft, and means drivingly connecting the second shaft to the cylinder.

5. A tool magazine according to claim 4, wherein the column is hollow, and the first and second shafts are disposed coaxially within the column.

6. A tool magazine according to claim 5, wherein the motor is connected through a driving transmission to the first driving shaft beyond a first end of the column, and the means connecting the second shaft to the column is disposed beyond the second end of the column.

7. A tool magazine according to claim 1, comprising a motor for rotating and axially traversing the cylinder, a brake associated with the motor and so constructed and arranged as to be applied when the motor is deenergized, and means for automatically deenergizing the motor and applying the brake when the desired tool receiving seat on the cylinder reaches the fixed tool pick up station.

8. A tool magazine according to claim 7, comprising cams angularly spaced about the axis of the cylinder at the same angular spacing as the axially extending rows of tool receiving seats in the cylinder, and a fixedly mounted pulse counter actuated by the cams as the cylinder rotates, the pulse counter actuating a motor and brake controlling switching means.

* * * * *